No. 847,696. PATENTED MAR. 19, 1907.
J. RILING & C. W. SAGEE.
GLASS FORMING MACHINE.
APPLICATION FILED JULY 7, 1906.

WITNESSES:

INVENTORS
Joseph Riling &
Charles W. Sagee
BY
Harding & Harding
ATTORNEYS.

UNITED STATES PATENT OFFICE.

JOSEPH RILING AND CHARLES W. SAGEE, OF PHILADELPHIA, PENNSYLVANIA, ASSIGNORS TO HERO FRUIT JAR COMPANY, OF PHILADELPHIA, PENNSYLVANIA, A CORPORATION OF PENNSYLVANIA.

GLASS-FORMING MACHINE.

No. 847,696. Specification of Letters Patent. Patented March 19, 1907.

Application filed July 7, 1906. Serial No. 325,052.

*To all whom it may concern:*

Be it known that we, JOSEPH RILING and CHARLES W. SAGEE, citizens of the United States, residing at Philadelphia, county of Philadelphia, and State of Pennsylvania, have invented a new and useful Improvement in Glass-Forming Machines, of which the following is a full, clear, and exact description, reference being had to the accompanying drawings, which form a part of this specification.

Our invention is especially applicable as an adjunct or accessory to a glass-forming machine, and has for its object to provide a fixed amount of glass to be fed into the molds.

In our improved machine we use an orificed rotary table, beneath which at the receiving-point and beyond is a plate which forms a bottom for the orifices. In the revolution of this table the orifices are carried beyond the plate, and as each orifice in the table passes beyond the plate it alines with a mold in the mold-table, so that the glass in the orifice falls into the mold. In order to enable the glass to be received in the orifice conveniently, properly, and in the desired amount, we support by an arm in a fixed position a guide which has a curved portion corresponding to and surrounding a portion of the top of the orifice in the table, the bottom of which guide and the top of the wall of the orifice having a cutting edge. In line with the face and open portion of this guide is the fixed rest, upon which the glass-gathering rod may be supported. The operator gathering the glass from the furnace on the end of this rod places the rod on the rest and places the proper amount of glass into the orifice by scraping it against the guide. This enables the operator to accurately determine the amount of glass, avoiding all necessity of hoppers or other adjunct apparatus, and produces the result more accurately than with hoppers or the like.

We will now describe the embodiment of our invention illustrated in the accompanying drawings.

Figure 1:
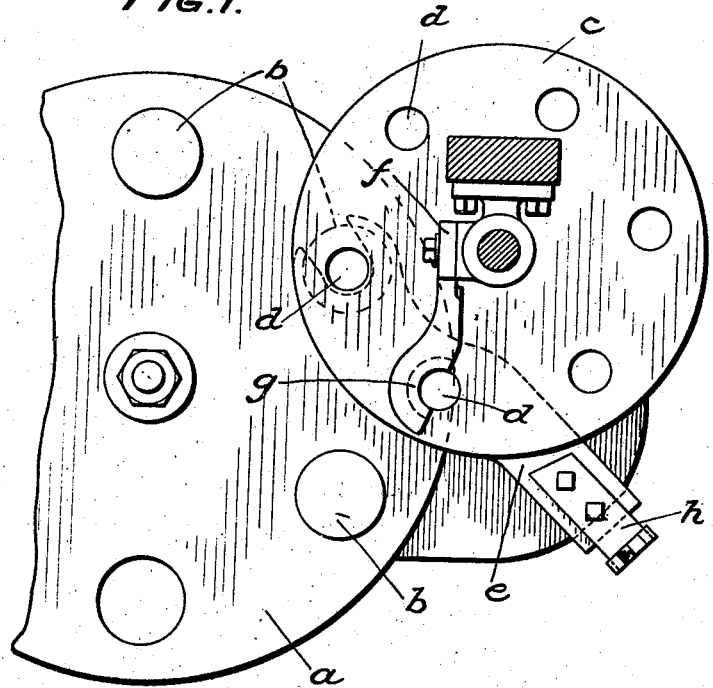
Figure 2:
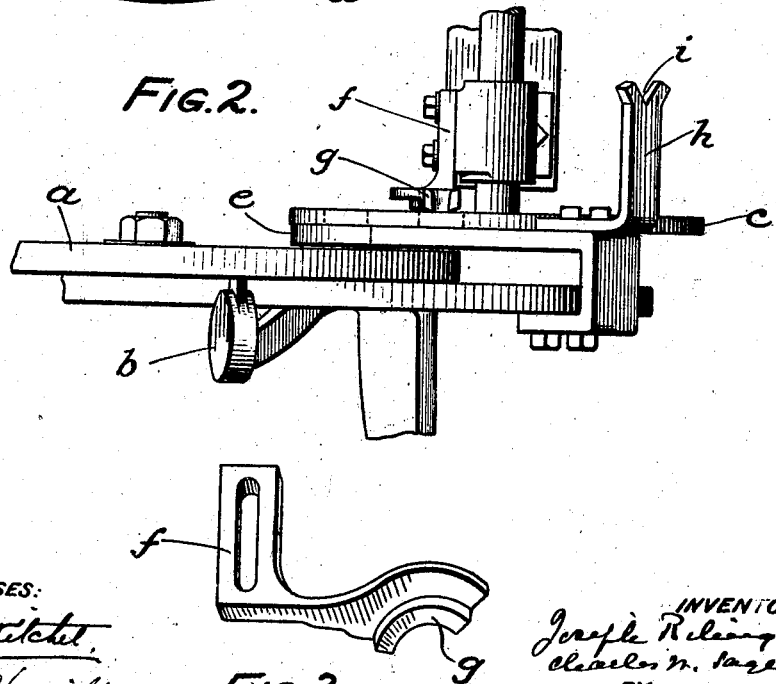
Figure 3:
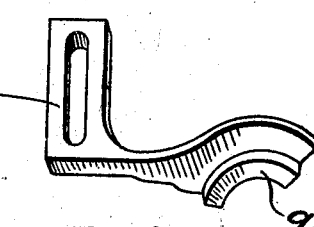

Figure 1 is a plan view of our invention. Fig. 2 is an elevation of our invention. Fig. 3 is a perspective view of the fixed guide.

$a$ represents the rotary table of a glass-pressing machine, having thereon the molds $b$.

$c$ is a glass-bending table, having therein the orifices $d$. A portion of this last-mentioned table overlaps the glass-pressing table, and the revolution of each is so timed that each orifice $d$ in the rotation of its table will coincide with a mold $b$ of table $a$. Beneath the table $c$ is a plate $e$, which extends a distance sufficient to cover the orifice $d$ in its movement from the point where it receives the glass until it alines with a mold $b$.

$f$ is a fixed bracket secured to and projecting from the axis of the table $c$. The outer end of this bracket has the curved guide $g$, which extends around and coincides with a portion of the top of the orifice $d$ when said orifice is at the place of the guide. Secured to a fixed portion of the machine so as to be in line with the face or open end of this guide $g$ is the support or rest $h$, having the forked or crotched end $i$, the upper surface of the orifice $d$ and the lower surface of the guide having cutting edges.

In practice, as stated, the operator gathers glass from the furnace on the end of the gathering-tool. He then places the end near the hand upon the crotched end of the support $h$ and scrapes or rubs the glass against the guide $g$ into the orifice $d$. In the revolution of the table any superfluous glass is cut off by the cutting edges. The glass in the orifices is held there by the plate $e$ until the orifice coincides with the mold, when it drops therein. By this arrangement the glass in regular amounts is fed to the molds and the amount readily determined by the operator better than and without the necessity of any hopper.

Having now fully described our invention, what we claim, and desire to protect by Letters Patent, is—

1. In a machine of the character described, in combination, a rotary orificed table, a plate underlying a portion thereof, and a fixed guide, having an open-ended concave guiding-face overlying said table, said guiding-face adapted to substantially coincide with a portion of the upper edge of the orifices whereby the end of the gathering-tool with the glass may be entered between the ends of the guiding-face and the glass rest against said face.

2. In a machine of the character described, in combination, a rotary orificed table, a plate underlying a portion thereof, and a fixed guide, having an open-ended concave guiding-face overlying said table, said guiding-face adapted to substantially coincide with a portion of the upper edge of the orifices whereby the end of the gathering-tool with the glass may be entered between the ends of the guiding-face and the glass rest against said face, the upper surface of the orifices, and the lower surface of the guide having cutting edges.

3. In a machine of the character described, in combination, a rotary orificed table, a plate underlying a portion thereof, and a fixed guide, having an open-ended concave guiding-face overlying said table, said guiding-face adapted to substantially coincide with a portion of the upper edge of the orifices whereby the end of the gathering-tool with the glass may be entered between the ends of the guiding-face and the glass rest against said face, and means to produce a cutting action between the lower surface of the guide and the upper surfaces of the orifices.

4. In a machine of the character described, in combination, a rotary orificed table, a plate underlying a portion thereof, a fixed curved guide, adapted to conform to a portion of the upper surfaces of the orifices, and a fixed support for the gathering-rod in line with the face of said guide.

5. In a machine of the character described, in combination, a rotary orificed table, a plate underlying a portion thereof, a fixed curved guide, adapted to conform to a portion of the upper surfaces of the orifices, and a fixed support for the gathering-rod in line with the front of said guide, the upper surfaces of the orifices and the lower surface of the guide having cutting edges.

6. In a machine of the character described, in combination, a rotary orificed table, a plate underlying a portion thereof, a fixed curved guide, adapted to conform to a portion of the upper surfaces of the orifices, and a fixed support for the gathering-rod in line with the front of said guide, and means to produce a cutting action between the lower surface of the guide and the upper surfaces of the orifices.

In testimony of which invention we have hereunto set our hands, at Philadelphia, Pennsylvania, on this 29th day of June, 1906.

JOSEPH RILING.
CHARLES W. SAGEE.

Witnesses:
CLAYTON D. GRISCOM,
HUTTON KENNEDY.